Figure 1:
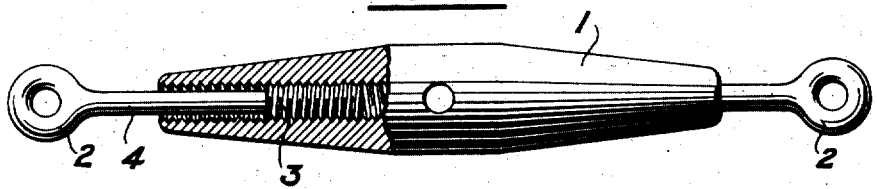

H. L., A. E. & H. O. SHORT.
TENSION ADJUSTING COUPLING.
APPLICATION FILED JUNE 21, 1910.

1,002,001.

Patented Aug. 29, 1911.

UNITED STATES PATENT OFFICE.

HORACE LEONARD SHORT, ALBERT EUSTACE SHORT, AND HUGH OSWALD SHORT, OF BATTERSEA PARK, LONDON, ENGLAND.

TENSION-ADJUSTING COUPLING.

1,002,001.     Specification of Letters Patent.     Patented Aug. 29, 1911.

Application filed June 21, 1910. Serial No. 568,161.

*To all whom it may concern:*

Be it known that we, HORACE LEONARD SHORT, ALBERT EUSTACE SHORT, and HUGH OSWALD SHORT, subjects of the King of Great Britain, residing at Battersea Park, in the county of London, England, have invented a certain new and useful Improved Tension-Adjusting Coupling, and of which the following is a specification.

This invention relates to improvements in and connected with devices for coupling and adjusting the tension of tie rods, tension wires, wire ropes and the like, of the type in which a nut or sleeve, having internal right and left screw threads at the respective ends thereof, is employed to engage the correspondingly screw-threaded ends of tie rods, or of bolts to which latter tension wires, wire ropes or the like are attached, the ends of the tension wires being commonly connected to eyes formed on the ends of such bolts by passing the wire through the eye of the bolt and bending the same over. By then turning the sleeve in one direction tension is applied to the connected members, and obviously by turning the sleeve in the opposite direction the said tension is relieved.

Hitherto in such devices the ends of the tie rods or bolts (hereafter referred to as bolts), have been provided with a screw-thread of a greater length than that necessary to constitute a firm connection with the said sleeve, sufficient to apply the tension required without stripping the screw-thread either on the said bolt or in the sleeve, and with such devices it is a difficult matter, unless by measuring or counting the number of threads outside the sleeve, to ascertain how much of the screwed end is within the sleeve, so that in releasing the tension it sometimes happens that the sleeve is turned to such an extent that the bolts become entirely disengaged therefrom, often with disastrous results. Beyond this, it often happens in practice that only one or two or say three threads of the bolt have been by accident left inside the sleeve, and then when the working strain has come upon the bolts the threads have stripped and the bolts have been drawn out of the sleeve.

Now the object of the present invention is to so form the bolts that with ordinary care and intelligence it is practically impossible on the one hand for them either to become inadvertently disengaged from the sleeve, and equally impossible on the other hand for the operator to leave an insufficient number of threads engaging in the threads within the sleeve, and according to one arrangement, such disengagement is rendered absolutely impossible.

In a device constructed according to this invention, the bolt which is to be engaged by the sleeve is provided with a screw-threaded portion of greater diameter than the main portion of the bolt, and of sufficient length to enable the desired tension to be applied to the bolt without stripping the thread, and this screw-threaded portion when the bolt is in tension, is for its entire length engaged by the sleeve. Instead, however, of screw-threading only a portion of the bolt, the said bolt may be provided with a screw-thread as usual, in which case an annular groove is formed around the bolt, dividing the screw-threaded part into two portions leaving a space on the shank between them; the diameter of the core, or shank of the bolt at this part is equal to the diameter at the bottom of the screw-thread on the bolt, and it should not be less than this diameter in order to avoid undue weakening of the bolt. With this construction when the sleeve is turned to release the tension, it will be known when the annular groove on the shank appears outside the sleeve, that the said sleeve has been turned sufficiently, and that it would not be safe to turn it any more.

When only a short portion of the bolt is screw-threaded, a shoulder is formed where the screw-threaded part joins the main shank, and in order to prevent the withdrawal of the bolt from the sleeve when the screw-threaded end of the bolt has been screwed thereinto, the end of the sleeve is burred inwardly so as to act as an abutment to the said shoulder.

In the first part of this specification it has been mentioned that when tension wires are being dealt with with this connection device, the ends of the said wires are passed through eyes at the ends of the bolts, but if so desired the ends of the bolts may be forked in a known manner and be provided with a removable pin passing at right angles through the forked members, so that when desired the pin can be removed and the end of the wire thus easily detached from the bolt or again connected therewith.

The invention will be readily understood by reference to the accompanying drawings, which show the same applied to a well known form of device employed for straining wire ropes, and wherein—

Figure 2:
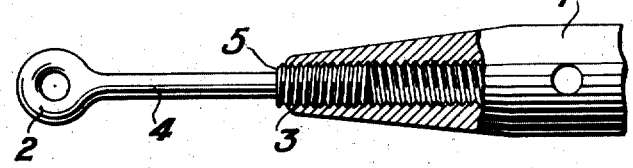
Figure 3:
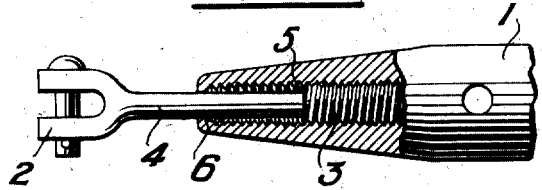
Figure 4:
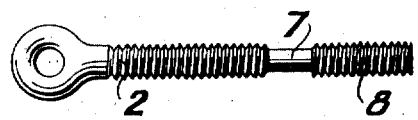

Figure 1 is a part sectional elevation of a sleeve showing the eye bolts in the position they may assume when the wire attached thereto is in tension. Fig. 2 is a sectional elevation of part of the sleeve, showing the bolt screwed outwardly as far as is safe when in full tension. Fig. 3 is a sectional view showing the end of the sleeve burred inwardly to prevent the withdrawal of the bolt, and illustrating the latter with a forked end. Fig. 4 shows in elevation a modified form of the bolt.

The sleeve 1 of the device is as usual formed with internal screw-threads, the screw-thread in one end of the sleeve being in the reverse direction to the screw-thread at the opposite end. This sleeve engages as usual the screw-threaded ends of bolts 2. These bolts are, according to the construction shown in Figs. 1 to 3, provided with a comparatively short enlarged screw-threaded portion 3, adapted to be engaged by the sleeve 1. The screw-threaded portion 3 of the bolt being of larger circumference than the main shank 4 thereof, a shoulder 5 is formed where the shank joins the threaded part.

In order to prevent the bolt being entirely withdrawn from the sleeve, we bur the end of the sleeve inwardly as shown at 6 in Fig. 3, so as to form an abutment to the shoulder 5 when the screw has been turned outwardly as far as is desirable.

When it is required to apply the tension to the wire rope or the like connected to the bolts 2, the sleeve 1 is so turned that the said bolts move toward the center of the sleeve as shown in Fig. 1, and when the tension is to be slackened the sleeve is turned in the reverse direction, so that the inner ends of the bolts 2 move toward the outer ends of the said sleeve.

The sleeve 1 may be turned until the shoulder 5 on bolt 4 appears just outside said sleeve as shown in Fig. 2, and when the shoulder is seen so projecting beyond the sleeve, it will be known that it would be unsafe to turn the sleeve any farther.

At Fig. 3 the end of the bolt is shown forked and having a pin passed through the forked members around which pin the end of a tension wire may be fixed.

Fig. 4 shows an eye bolt of the ordinary type, but having an annular groove 7 formed thereon, thus dividing the screw into two separate portions, the forward portion 8 being of sufficient length to insure secure connection between the bolt 2 and sleeve 1 when tension is relieved, and obviously the part 8 of the bolt is of sufficient length as to be calculated to carry all the tension which the device is constructed to sustain. With this arrangement, when the plain portion formed by the annular groove 7 is seen outside the sleeve, it will be known that the bolt cannot with safety be further unscrewed from said sleeve while the working tension is on it.

What we claim as our invention and desire to secure by patent is:—

1. A coupling for adjusting the tension of members such as tie rods, tension wires, wire ropes and the like, comprising in combination, an internally screw-threaded tubular sleeve, externally screw-threaded members adapted to screw into said sleeve, and shoulders on said members limiting the screw-threads in one direction and at such a distance from the corresponding extremities of such members as provides a safe length of screw in said sleeve when said shoulders appear at the outer extremities of said sleeve in the act of unscrewing the latter.

2. A coupling for adjusting the tension of members such as tie rods, tension wires, wire ropes and the like, comprising in combination, an internally right and left screw-threaded tubular sleeve, eyebolts entering said sleeve at respective ends thereof, enlargements on the entering ends of said bolts, right and left screw-threads on said enlargements for engaging the respective screw-threads of said sleeve, said enlargements being of sufficient length to afford a safe length of screw-thread, and the inner extremities of said enlargements constituting indicators, operating with the outer ends of said sleeve to indicate the safe limit in the act of unscrewing said sleeve.

3. A coupling for adjusting the tension of members such as tie rods, tension wires, wire ropes and the like, comprising in combination, an internally right and left screw-threaded tubular sleeve, right and left screw-threaded members in respective ends of said sleeve, connecting means on said members extending outwardly of said sleeve, inwardly projecting ends on said sleeve adapted to constitute stops for said members in the act of unscrewing, said screw-threaded members having a safe length of screw and their ends coöperating with said inwardly projecting ends, to constitute a safety stop and indicator substantially as set forth.

In witness whereof we have hereunto set our hands in the presence of two witnesses.

HORACE LEONARD SHORT.
ALBERT EUSTACE SHORT.
HUGH OSWALD SHORT.

Witnesses:
GRIFFITH BREWER,
WILLIAM A. MARSHALL.